United States Patent Office 3,197,783
Patented July 27, 1965

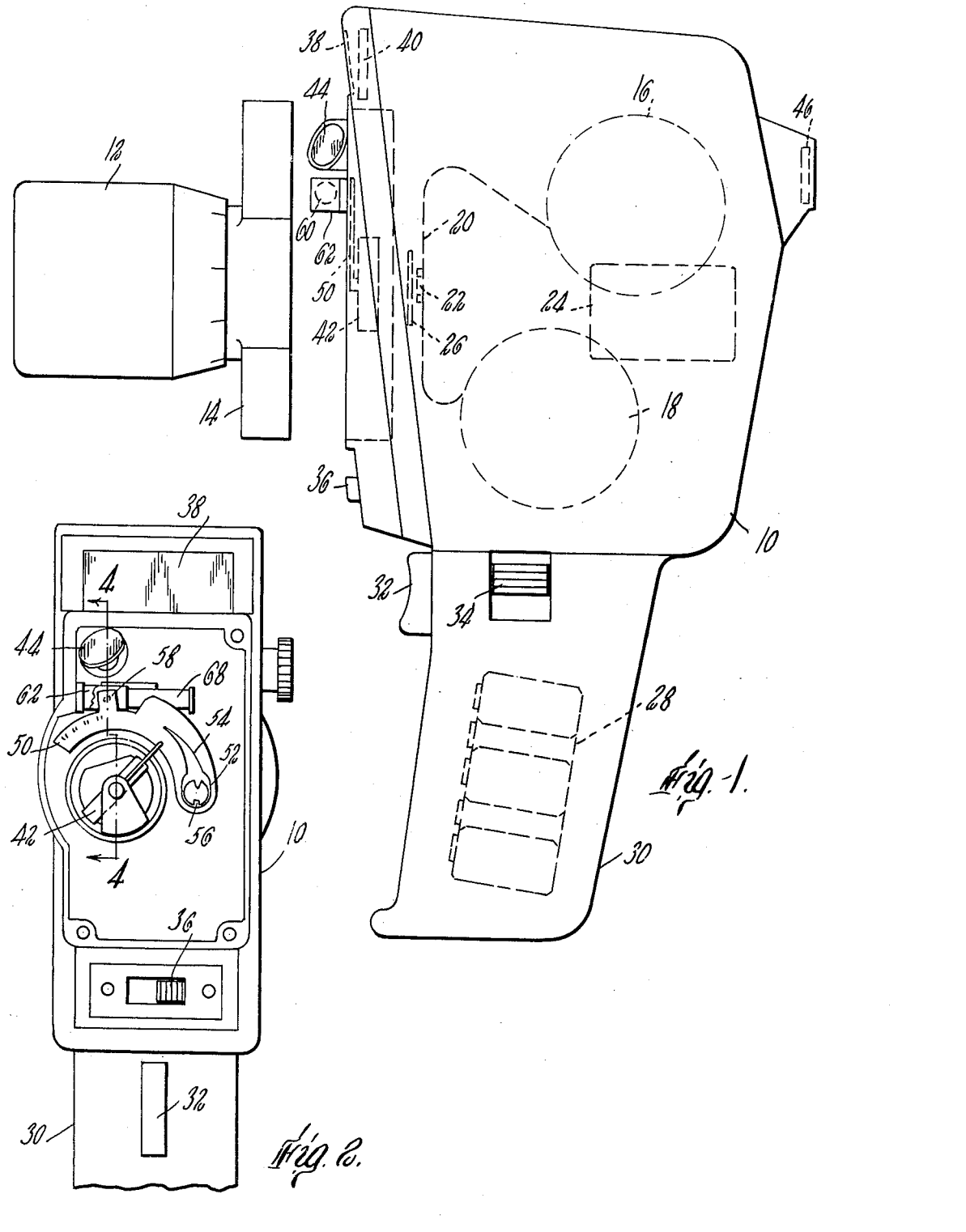

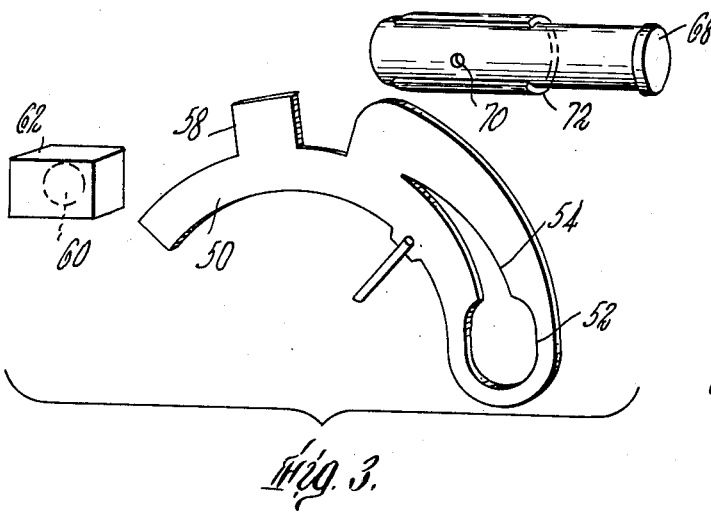
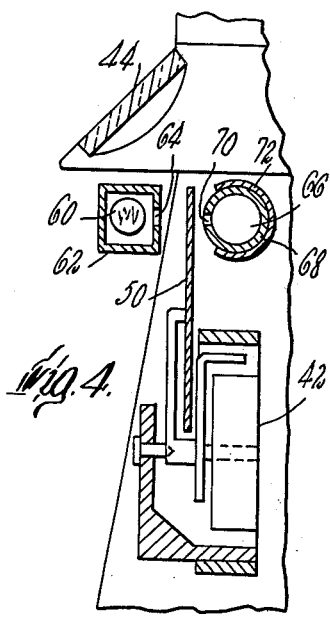
Fig. 3.
Fig. 4.
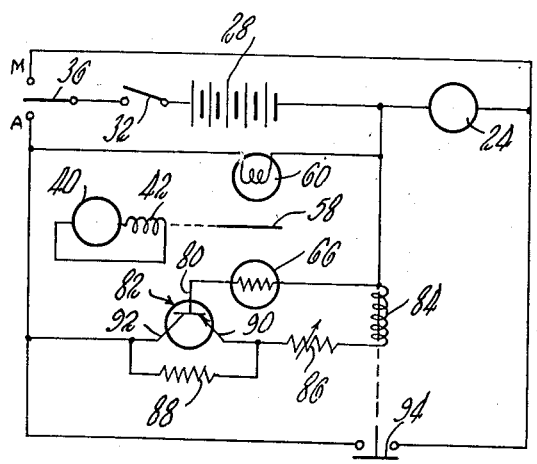
Fig. 5.
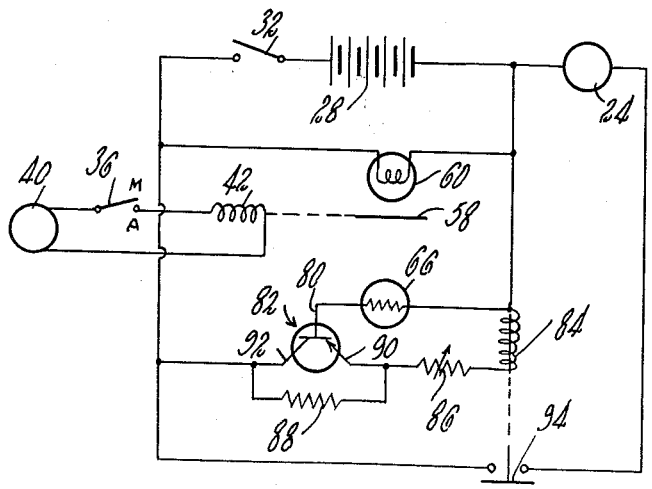
Fig. 6.

3,197,783
ELECTRIC CAMERA CONTROL APPARATUS
Byong-ho Ahn, Brockton, and Samuel Silbovitz, Quincy,
Mass., assignors to Keystone Camera Company, Inc.,
Boston, Mass., a corporation of Massachusetts
Filed Sept. 18, 1962, Ser. No. 224,306
11 Claims. (Cl. 352—176)

This invention relates to photographic cameras and more particularly to improvements in electrically operated cameras of the motion picture type.

Conventionally, motion picture cameras have employed a spring motor for supplying energy to advance the film past the photographic aperture and to rotate the shutter and control of the image-recording process. There is interest in utilizing another source of power, electricity, for driving the component in the image-recording operation. However, electrical drive motors of the type suitable for use in motion picture cameras and similar apparatus create problems as their output speed varies as a function of the applied voltage; and while they will continue to run at low voltages, these speeds are below the speed necessary for proper image-recording operations. For example, in a motion picture camera the speed of the film past the image aperture is a pre-established value, and should the film move more slowly, the recorded action when projected will appear speeded up and be unrelated to the actual speed. Further, the film may be overexposed and thus the image will be recorded improperly or not at all. For these reasons, the cameras employing electric drive motors have not found wide public acceptance, particularly in the amateur or home motion picture market.

Accordingly, it is an object of this invention to provide a novel and improved motion picture camera control circuitry for use in controlling the operation of an electrically driven motion picture camera.

Another object of the invention is to provide novel and improved motion picture camera control circuitry which renders the electric motor drive mechanism inoperative under conditions which would produce improper drive speeds of the camera mechanism.

Another object of the invention is to provide a novel and improved electric motor driven motion picture camera circuit in which electric motor drive control is integrated with incident light control so that if there is insufficient incident light for proper film image recording operations the motor will not operate.

In accordance with principles of the invention, there is provided an electric motor control circuit having an electric motor for driving the film-advancing mechanism and shutter mechanism. Connected in circuit with this electric motor is voltage sensitive control means for controlling the completion of the motor circuit. In the preferred embodiments this voltage sensitive control means includes a radiation source powered by the same electric source as the motor which has a radiation output proportional to the source voltage. A radiation sensitive electrical component is disposed in spaced relation to the radiation generating device and connected in circuit to control the completion of the motor circuit. In these embodiments a vane, a portion of which is opaque, is mounted for movement into and out of the region between the radiation source and the radiation sensor to control the amount of radiation falling on the sensor. This vane is coupled to an incident light sensor and is positioned in accordance with the amount of incident light available for image-recording operations. The radiation sensor is connected to a transistor which provides current amplification and controls current flow to a relay coil that operates contacts connected in the motor circuit. This circuitry, in a compact and relatively inexpensive assembly of components, provides a mechanism for preventing motor operation when the source voltage falls below a predetermined value (which value would be insufficient to drive the motor at the required speed) and also permits accommodation of an accurate and improved incident light control operative to prevent motor operation if the amount of available light is insufficient for the proper image-recording purposes. The circuitry also can be easily switched over to manual operation in which the incident light control and low voltage control are by-passed. (In an alternative arrangement the incident light sensor circuit is opened to eliminate the incident light control while maintaining the low voltage control.)

Thus it will be seen that the invention provides an improved motor control mechanism particularly useful in electrically driven motion picture cameras and similar image-recording devices which permits in a simple manner a sensing of the voltage available and prevents operation of the image-recording mechanism if insufficient voltage is available for proper operation. Such a mechanism while providing additional control also eliminates the separate battery test galvanometer, which is conventionally employed to provide a visible indication of the quality of the battery.

Other features, objects and advantages of the invention will be seen as the following description of the preferred embodiment progresses, in conjunction with the drawings, in which:

FIG. 1 is a side elevational view of a motion picture camera incorporating apparatus constructed in accordance with the invention;

FIG. 2 is a front view of the motion picture camera of FIG. 1, with the lens housing removed, showing the vane and light control mechanism therefor;

FIG. 3 is a perspective view of the light radiation source and radiation sensor and control vane interposed therebetween;

FIG. 4 is a sectional view of the apparatus of the radiation source and sensor employed in the camera of FIGS. 1 and 2 taken along the lines 4—4 of FIG. 2;

FIG. 5 is a schematic diagram of the electrical circuitry employed in the camera shown in FIGS. 1–4; and FIG. 6 is an electric circuit diagram of a modified embodiment of the invention.

With reference to FIG. 1, there is shown a motion picture camera having a casing 10 on the forward end of which is mounted a lens system 12 which has a support bracket 14 by means of which the lens system is secured to the camera case 10. Mounted within the case 10 are two reels 16, 18 for advancing film along the path 20 indicated generally by dotted lines past an exposure aperture 22 for image-recording purposes. A motor 24 is employed to drive the film past the exposure aperture and also to operate a shutter mechanism generally indicated at 26 at that point for controlling the light incident on the film. Batteries 28 supplying power to the motor 24 are mounted in the support and actuating handle 30. A motor control switch 32 is provided on the front of the actuating handle, and snap lock 34 providing access to the battery compartment is provided on the handle. A manual-automatic control switch 36 is mounted on the lower part of the front wall of the camera housing. At the upper part thereof there is provided a window 38 behind which is mounted a photocell 40 which in response to incident light controls the energization of the coil of a galvanometer 42 (FIG. 2). The photocell may be one of several known types, for example a photovoltaic cell, or a photoconductor connected in series with a voltage source.

The camera shown in this embodiment employs a through-lens viewing system in which a portion of the light passing through the lens 12 is reflected into a finder system, including a mirror 44 and then rearwardly through finder optics to a view-finding eyepiece 46 at the rear of the camera case.

With reference to FIG. 2, on the galvanometer there is mounted a vane 50 having an aperture that has a first enlarged portion 52 and a tapered portion 54. This movable vane cooperates with a fixed vane 56 which has two inwardly extending tabs and is mounted immediately in front of the image aperture. The cooperation of the fixed and movable vanes defines the exposure aperture for light passing through the lens for incidence on the film behind the image aperture. Also mounted on the movable vane 50, as best seen in FIG. 3, is a tab 58.

Mounted in front of the vane is a source of radiation 60 in the form of a small light bulb mounted in an opaque casing 62 that has a small aperture 64 facing directly towards the tab of the vane when the vane is in the position shown in FIG. 2. In alignment with this light source and aperture 64 is a photocell 66 that is mounted on the rear side of the vane opposite the light source. That photocell is mounted in an opaque casing 68 that has a small aperture 70 and is supported in a cylindrical clamp 72 so that it is frictionally held in position and may be aligned with the light bulb casing aperture.

This method of securing the photocell 66 enables accurate adjustment in the position of the aperture 70 relative to the light source 60 and the tab 58. In the position of the galvanometer shown in FIG. 2 there is insufficient energy supplied to the galvanometer by the circuitry controlled by photocell 40 to rotate it in the clockwise direction, effectively an indication that it is insufficient incident light for proper operation of the camera in an image-recording operation. In that position the tab 58 is directly interposed between the light source 60 and the aperture 70 over the photosensitive area of the photocell 66. The position of the vane 50 providing the widest effective aperture of the camera (in this case an f/1.8 aperture) can be determined. Aperture 70 is adjusted so that in this vane position the vane tab 58 sufficiently uncovers the aperture 70 to permit light from bulb 60 to enter therein and reduce the resistance of the photocell. Provided the battery voltage is adequate, the resulting signal is sufficient to permit the camera control circuits to be energized upon the depression of the control switch 32. This incident light control is accomplished without imposing any additional load on the galvanometer mechanism.

The electrical circuitry for this structure is shown in FIG. 5. As shown in that figure, there is a battery 28 which is composed of five one-and-one-half volt cells. That battery is connected in series circuit with the motor 24 through a manual-automatic control switch 36 and the main actuating switch 32 when the switch 36 is in the manual position. When the switch 36 is in its second position (automatic) a circuit is completed across the battery by the main switch 32 to energize the light source 60. Connected in circuit with the battery 28 is the photocell 66 which is connected to the base electrode 80 of transistor 82. A relay coil 84 is connected in the emitter-collector circuit of the transistor with a variable resistance 86 connected in series to the emitter terminal and a protective resistor 88 connected across the transistor between the emitter 90 and the collector 92. A parallel circuit across the battery motor is completed by contacts 94 which are actuated by the relay coil 84 of the relay.

In operation, with the switch 36 in the automatic position, lamp 60 is energized when the switch 32 is closed. If the vane tab 58 is not positioned between the lamp 60 and the cell 66, radiation will fall on the cell and lower its effective resistance so that the base 80 of the transistor will be placed at a potential negative with respect to the emitter 90, permitting the transistor to conduct and energize relay 84. With that energization contacts 94 will be picked up to complete the motor circuit from the battery through switches 32, 36 and contacts 94 and permit the motor to run. However, if the battery voltage has fallen to a predetermined level (in the order of five volts), the radiation output of the light source drops; and even if it is completely unobstructed by the vane 58, the resistance of the photocell 66 will not be sufficiently lowered by that radiation to permit the transistor to conduct adequately through its emitter-collector circuit. Without that conduction relay 84 will not be energized and the motor circuit will remain deenergized.

In the preferred embodiment a Clairex photocell Type 605L is employed which has a dark resistance in the order of one megohm and a resistance of 7,000 ohms when a light intensity of two foot candles falls thereon. The lamp 60 employed has an operating life in excess of 50,000 hours and draws a current of less than 60 milliamperes. Transistor 82 may be Type 2N381; resistor 86 may be adjustable between 0–100 ohms; and resistor 88 may have a value of 10,000 ohms. In addition, relay coil 84 requires in the order of five volts to pick up and close contacts 94.

An alternative electrical circuit is shown in FIG. 6. In this embodiment a photocell 66 and light source 60 are again employed with tab 58 being movable into and out of the optical path between the light source 60 and the photocell 66. The circuit operates in the same way to sense low voltage and render the motor control circuit inoperative. However, the manual-automatic control switch 36, rather than being positioned directly in the motor control circuit, is positioned in the galvanometer circuit between the light sensing photocell 40 and the galvanometer coil 42. In the automatic position signals from the photocell 40 are applied to the galvanometer coil to cause a clockwise deflection as viewed in FIG. 2. However, in the manual position the galvanometer control circuit is open. (If necessary an auxiliary arrangement is provided to produce a deflection of the galvanometer to move the tab 58 out of the optical path between the source 60 and the photocell 66.) In this position the camera will be operated under the control of switch 32 independently of the amount of light available for image recording operations and the aperture size may be set manually as desired. However, the voltage sensing arrangement remains effective and should the battery voltage fall below the five volt limit (or other limit established depending on the characteristics of motor 24), the circuitry controlled by photocell 66 and relay coil 84 will not operate to close the relay contacts 94 and hence the motor circuit will not be completed. The inoperability of the camera in this circumstance is a clear indication to the operator that the batteries should be replaced.

Thus it will be seen that the invention provides a novel and improved motor control system particularly useful in photographic motion picture cameras where the speed of the motor must be accurately regulated to provide the proper picture recording operation. The system provides a continuous check on the battery voltage in an automatic manner to insure that the camera will be operating at at least the minimum speed required for proper operation. The system also accommodates a reliable control on the operation of the camera as a function of incident light available for proper picture taking operations which imposes no load on delicate galvanometer mechanisms. This latter control may be overridden for manual operation if desired.

While preferred embodiments of the invention have been shown and described various modifications thereof will occur to those of ordinary skill in the art. Therefore it is not intended that the invention be limited to the disclosed embodiments or to details thereof and departures may be made therefrom within the spirit and scope of the invention as defined in the claims.

We claim:

1. A motion picture camera control system comprising an electric motor, a source of electricity connected in circuit therewith to energize the motor, a light source connected across said electrical source, control means connected in circuit with said electrical source and said light source to energize said light source, and a light sensitive photocell connected in circuit controlling relation to said motor responsive to light from said source to energize said motor under the control of said control means only when the level of radiation from said source impinging on said photocell is above a predetermined value.

2. The apparatus as claimed in claim 1 and further including an incident light responsive member having an opaque portion disposed between said light source and said photocell to block light from impinging on said photocell when incident light falls below a predetermined value.

3. A motion picture camera control system comprising an electric motor, a source of electrical energy connected in circuit with said motor, a radiation source, radiation sensitive means disposed in spaced relation to said source and connected in circuit controlling relation to said motor, and incident light responsive means having a first state blocking radiation between said radiation source and said radiation sensor when the incident light is below a predetermined value, and a second state passing radiation between said radiation source and said radiation sensor when incident light is above said predetermined value.

4. The system as claimed in claim 3 wherein said radiation source is energized by said source of electricity and the output of said radiation source is a function of the voltage applied thereto by said source of electricity.

5. The system as claimed in claim 3 wherein said incident light responsive means includes a vane movable along an arc and further including means to mount said radiation sensor so that said sensor is adjustable along a line substantially tangent to the arc through which said vane moves.

6. In a photographic camera of the type having a case, means defining an exposure aperture, means for advancing photographic film progressively past said exposure aperture, shutter means movable across said exposure aperture for controlling the exposure of photographic film, an electric motor connected to drive said film advancing means and said shutter means, a source of electricity connectable in circuit with said electric motor, and control means including switch means manually operable from the exterior of said case for connecting said source of electricity in circuit with said electric motor at an operator's will, the improvement which comprises, in combination, a first photoelectric cell, a galvanometer having a coil connected in circuit with said first cell, said coil being mounted for rotational movement in response to a signal from said first cell, a light source connected across said source of electricity, a second photoelectric cell connected in circuit controlling relation to the said motor and disposed to sense radiation from said light source, and a control element connected for actuation in response to movement of said coil to a position indicative that light impinging on said photoelectric cell is of unsatisfactory magnitude for proper exposure of the film, said control element when said coil is in said position being operative to block the impingement of radiation from said light source on said second cell to prevent energization of said electric motor independently of said switch means.

7. In a photographic camera, the combination of a case, means defining an exposure aperture, means for advancing photographic film progressively past said exposure aperture, shutter means movable across said exposure aperture for controlling the exposure of said film, electric motor means having an output shaft connected to said film advancing means and said shutter means in driving relation, a source of electricity connected in circuit with said motor, a light source connected across said source of electricity, a first photocell disposed for response to radiation from said light source, motor circuit controlling means responsive to said first photocell, a second photocell arranged to provide a signal as a function of the light external of said case impinging thereon, a galvanometer having a coil connected in circuit with said second cell, said coil being mounted for rotational movement in response to a change in signal from said second cell, a control element connected to move with said coil whereby said control element is directly adjusted by movement of said coil for movement into and out of a limiting position in which position said control element is interposed in the optical path between said first photocell and said light source so that said motor circuit controlling means prevents energization of said motor independently of said control means.

8. The combination as claimed in claim 7 wherein said motor circuit controlling means includes a transistor having a control electrode, and a relay having a coil connected in circuit with said transistor and contacts operated by said relay coil connected in circuit with said electric motor, and said first photocell is connected in circuit with said control electrode to control the energization of said relay coil.

9. In a photographic camera of the type having a case, means defining an exposure aperture, an adjustable diaphragm for controlling the size of said exposure aperture, shutter means movable across said aperture for controlling the exposure of photographic film, an electric motor connected to drive said film advancing means and said shutter means, a source of electricity connectable in circuit wtih said electric motor, and control means including switch means manually operable from the exterior of said case for controlling the energization of said motor at an operator's will, the improvement which comprises in combination, a first photoelectric cell providing a signal as a function of light impinging thereon, a galvanometer having a coil connected in circuit with said cell, said coil being mounted for rotational movement in response to a change in signal from said photoelectric cell, first means coupling said coil and said diaphragm whereby said diaphragm is directly adjusted by movement of said coil to increase and decrease the diaphragm aperture with the decrease and increase respectively of light impinging on said cell, a light source connected across said source of electricity, a second photocell disposed for response to radiation from said light source, motor circuit controlling means responsive to said second photocell, a control element second means coupling said coil and said control element whereby said control element is directly actuated by movement of said coil to a limiting position indicative that light impinging on said first photoelectric cell is of unsatisfactory magnitude for proper exposure of the film, and support means for said light source and said second photocell enabling the positioning of said light source and said second cell relative to one another so that said control element blocks impingement of light on said second cell when said coil is in said limiting position, inhibiting in conjunction with said control means operation of said shutter means independently of said control means.

10. The combination as claimed in claim 9 wherein said motor circuit controlling means includes a transistor having a control electrode, and a relay having a coil connected in circuit with said transistor and contacts operated by said relay coil connected in circuit with said electric motor, and said second photocell is connected in circuit with said control electrode to control the energization of said relay coil.

11. The combination as claimed in claim 10 wherein said light source is mounted within a housing having an aperture through which radiation emerges and said second photocell is mounted in a casing having a similar aperture and said support means includes a friction clamp which permits movement of said photocell casing aperture relative to said light source housing aperture.

References Cited by the Examiner

UNITED STATES PATENTS

| 3,023,665 | 3/62 | Estes | 352—176 |
| 3,062,091 | 11/62 | Akahane | 352—176 |

FOREIGN PATENTS 1,235,184  5/60  France.

NORTON ANSHER, *Primary Examiner.*

WILLIAM MISIEK, *Examiner.*